May 13, 1969 G. E. DENNIS ET AL 3,443,958
METHOD OF PREPARING GROUND CEREAL GRAINS
IN THE PRODUCTION OF BREWERY MASH
Filed Feb. 18, 1966
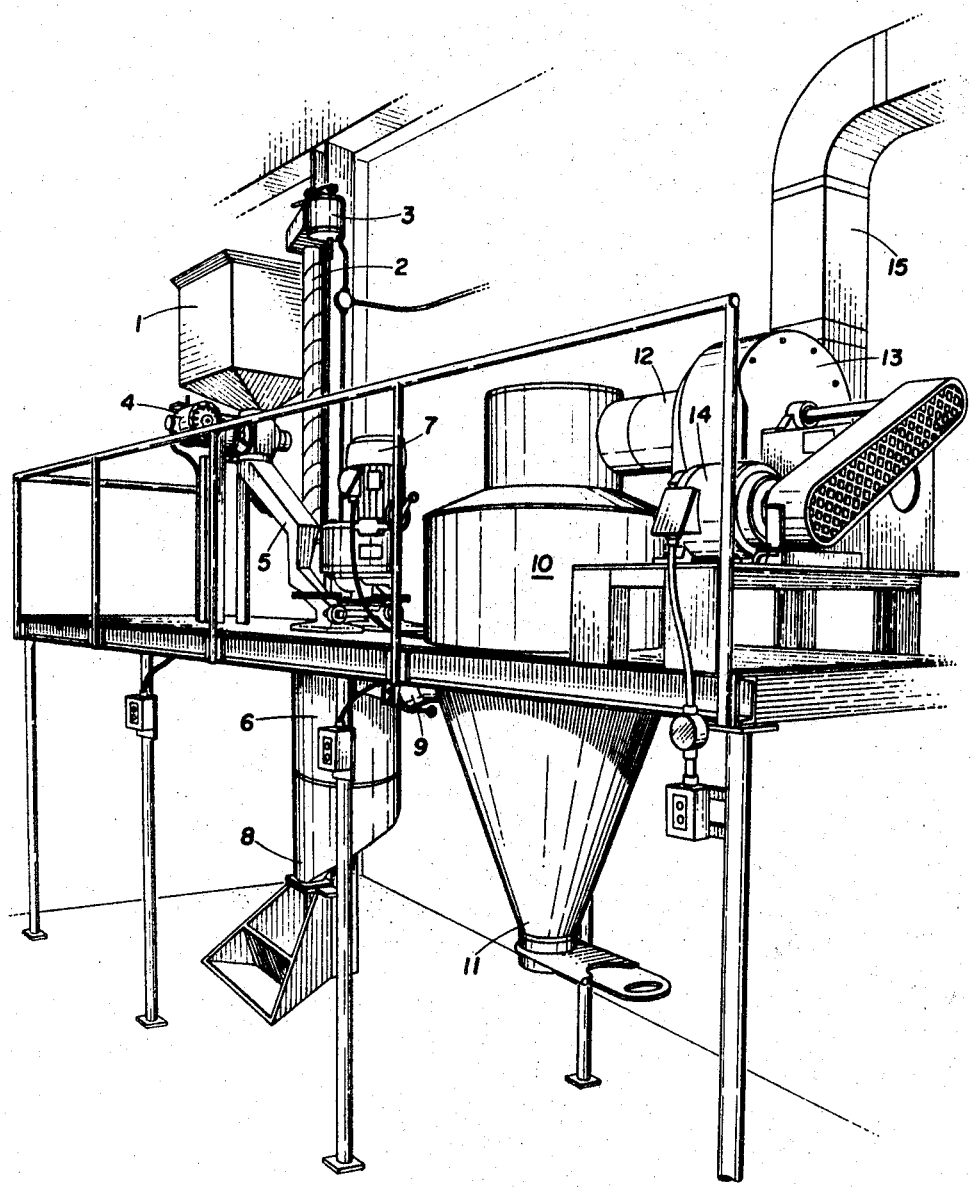
INVENTORS
GEORGE ELSON DENNIS
KENNETH RONALD ROBINSON
& RICHARD CHARLES QUITTENTON
by: Fisher, Christen, Sabol, & Caldwell
Agent United States Patent Office 3,443,958
Patented May 13, 1969

3,443,958
METHOD OF PREPARING GROUND CEREAL GRAINS IN THE PRODUCTION OF BREWERY MASH
George E. Dennis, 404 Wortley Road, London, Ontario, Canada, and Kenneth R. Robinson, Cooksville, Ontario, and Richard C. Quittenton, London, Ontario, Canada; said Robinson and said Quittenton assignors to John Labatt Limited, London, Ontario, Canada
Filed Feb. 18, 1966, Ser. No. 528,604
Int. Cl. C12c 7/04
U.S. Cl. 99—52                 3 Claims

ABSTRACT OF THE DISCLOSURE

A process for producing brewers' wort in which cereal grains are dehulled, the dehulled grain is ground to form a fine grist and at least part of the hulls removed before grinding are recombined with the ground dehulled grain and passed through the mashing stage in the usual manner.

---

This invention relates to the preparation of brewers' wort, and has as its principal object an improved method of preparing the ground cereal grains used in the preparation of mash from which the wort is derived.

In the production of brewers' wort, malt and other cereal grain adjuncts are ground to form a grist and this grist is mixed with water to form a mash. The mash is then heated in a mashing tun to convert the starch in the mash to sugars. It is also possible to prepare a mash from unmalted cereal grains, such as unmalted barley, by adding diastatic and proteolytic enzymes which replace the enzymes contained in the malt.

The mash thus obtained contains a liquid which is a sweet wort and this sweet wort is separated from the spent ground grains by lautering.

The grist of ground malt or unmalted raw cereal grains is conventionally obtained by passing the grain through a roller mill. The roller mill has the effect of crushing the grain so as to provide a finely ground kernel without excessive destruction of the hull. It is important to retain the hulls as undamaged as possible since they form the filter bed in the lautering operation. Thus it will be seen that the milling operation for brewing has traditionally been a compromise between hull damage and grist size distribution, with a finer grind giving a greater yield but a slower run-off because of the increased hull destruction.

According to this invention it has been determined that the above difficulties can be overcome by removing the hull from the grain before the milling operation. With the hulls removed the kernels of grain can now be more finely ground than was possible in the past and then the finely ground kernels can be recombined with the hulls at any point before the lautering stage. The result of this is an increased yield without any significant sacrifice in run-off time. A series of pilot plant tests indicated that an average yield increase of up to 2% could be obtained with a less than a 15% increase in lautering time.

The degree to which the kernels can be more finely ground according to this invention will be entirely dependent upon the particular situation. Thus, the actual particle size will be dependent upon the nature of the grain, the balance of the lautering time against yield permissible in a given situation, etc.

In addition to the above advantage there are also numerous other advantages to be obtained from this new procedure. Thus, it has been well established in the art of brewing that the sharp bitter resins and tannins of malt husks are dissolved to some extent during mashing. These components are largely responsible for the sharpness or tanginess of beer and it will be seen that this invention permits flexibility in determining the amount of flavour which is desirable from the hulls since part or all of the hulls may be eliminated prior to mashing. There is also complete flexibility in the amount of hulls which will be present in the mash at the lautering stage in order that the optimum combination of yield and run-off rate can be obtained.

It is also known that malt acrospires are formed just beneath the hull during barley germination and as a result of kilning become very dry and brittle. During malt dehulling according to this invention, the acrospires are knocked from the kernel and pulverized and appear in the hull fraction. By a simple screening of the hulls, the acrospire dust can be separated from the hulls. This separated dust is known to originate from acrospires due to its high protein content. The acrospires represent a further important flavour component of beer which can be conveniently varied as a result of this invention.

The process of this invention is particularly advantageous when raw cereal grains (such as barley) are used since the raw cereal grains presented milling problems which the ordinary rolling mills used for malt could not handle. The difficulty was that the raw cereal grains tended to be so hard that their kernels could not be ground finely enough without serious destruction of the hulls. By the preliminary removal of the hulls according to the invention this difficulty is completely removed. Thus, the barley kernels can be successfully ground either in a rolling mill or any other type of mill, such as an impact mill.

The dehulling is conveniently carried out on a centrifugal scourer-aspirator, which has been found to be extremely effective in removing hulls without any appreciable damage. The hulls which are removed from the scourer-aspirator are then passed through a cyclone separator to collect the hulls as well as entrained fine particles and dust.

One embodiment of the device suitable for carrying out the process of this invention will now be described by reference to the attached drawing.

From the drawing it will be seen that the grain is elevated into hopper 1 by means of the elevating auger 2 which is driven by the electric motor 3. The grain passes out of the bottom of hopper 1 through the electrically driven rotary feeder 4 and passes down through chute 5 into the centrifugal dehuller 6. This dehuller is an Entoleter series 14 scourer-aspirator with an N–2050–11 rotor and a 110392 liner. The dehuller is driven by electric motor 7 and the dehulled kernels are removed by way of hopper 8. The removed hulls together with entrained dust are drawn through duct 9 into cyclone 10 where the hulls and dust are separated from the air stream. The hulls and dust are collected from hopper 11 while clean air passes through duct 12. A fan 13 driven by electric motor 14 is connected to duct 12, which fan draws air from the dehuller through the cyclone and up ventilator duct 15.

The device as shown is intended for a batch operation but it will be evident that is can be readily converted for continuous operation by providing a rotary feeder to continuously discharge hulls from the cyclone.

The invention will now be further illustrated by reference to the following non-limitative examples:

Example 1

Dehulling tests were conducted on unmalted Montcalm barley.

This barley was passed through an Entoleter dehuller and 12 to 14% by weight of hulls were removed. The total hull content of the barley is about 15% by weight. The kernels were then ground by being passed twice through a coffee-mill, followed by one pass through a two roll rolling mill at a roll spacing of 0.020 inch. The grist and hulls were then recombined in the mash. The grist size distribution obtained is listed in Table A below:

TABLE A

| Grist size Distribution | Original Grist, Percent | Improved Grist, Percent |
|---|---|---|
| Percent on screen— | | |
| #10 | 28.2 | 12.3 |
| #14 | 48.7 | 55. |
| #18 | 13.3 | 18.5 |
| #30 | 5.0 | 6.7 |
| #60 | 3.5 | 4.8 |
| #100 | 0.8 | 0.9 |
| Pan | 0.5 | 1.6 |

This barley mash along with corn was then used in an experimental brew prepared in accordance with Canadian Patent No. 634,865.

Yields were calculated by measuring the made-up kettle °Plato and measuring the kettle volume with a calibrated dip-stick. The yield is then calculated as follows:

$$\text{Yield} = \frac{10 \times °P \times \text{sp. gr. of wort} \times \text{gallons of wort} \times 100\%}{\text{lbs. malt grain in mash}}$$

It was found that a yield of 70.5% was obtained, which represented a yield increase of 4.1%. The lautering rate remained unchanged.

Example 2

A second quantity of barley was dehulled on the Entoleter scourer-aspirator and the kernels obtained were milled at 3500 r.p.m. in an Entoleter 27-inch centrimill. The grist size distribution obtained was as follows:

TABLE B

| | Percent |
|---|---|
| #10 screen | 13.4 |
| #14 screen | 22.1 |
| #18 screen | 23.1 |
| #30 screen | 20.0 |
| #60 screen | 15.0 |
| #100 screen | 3.0 |
| Pan | 3.4 |

The brew obtained from this grist was lautered at a slightly faster rate than normal and gave a clear wort. Again in this case improved yields were obtained.

Example 3

Malt was dehulled on the Entoleter scourer-aspirator at two different settings to obtain grist of two different compositions. Lager brews were prepared from these two grists as well as from a controlled grist and the results were as follows:

TABLE C

| | Control | Brew No. 1 | Brew No. 2 |
|---|---|---|---|
| Yield, percent | 73.2 | 75.2 | 75.3 |
| Run Off, min | 33 | 38 | 34 |
| Grist Screen Analysis, percent on screen— | | | |
| #10 | 12.0 | 3.0 | 3.3 |
| #14 | 25.0 | 6.3 | 5.4 |
| #18 | 23.7 | 19.5 | 15.3 |
| #30 | 17.8 | 25.8 | 30.3 |
| #60 | 12.8 | 25.0 | 26.2 |
| #100 | 4.7 | 8.4 | 13.0 |
| Pan | 4.0 | 12.0 | 6.5 |

The yield data indicated above was accumulated during normal brewing and was obtained from the made-up kettle °P and the dipped kettle volume.

Example 4

To further investigate the milling process of the invention, a carefully controlled set of all malt brews was run using a measured volume of mash and sparge water. The made-up kettle volume in these runs was measured in graduated cylinders. The controls were milled normally in a pilot brewery two roll mill with a roll spacing of 0.020 inch. The specials were dehulled (14% hull removal) with the kernals being milled by a double pass through the two roll mill, first at 0.020″ and then at 0.002″. All brews were made with 20 lbs. Montcalm malt in 35 l. mash water and 40 l. sparge water using a 30 minute 150° F. rest. Operating data for these tests is as follows:

TABLE D

| | Controls | | | Specials | | |
|---|---|---|---|---|---|---|
| | A | B | C | A | B | C |
| First Run, °P | 15.0 | 15.0 | 14.9 | 15.05 | 14.9 | 14.95 |
| First Run, pH | 5.70 | 5.65 | 5.65 | 5.70 | 5.69 | 5.60 |
| Last Run, °P | 1.8 | 2.1 | 2.0 | 1.5 | 1.45 | 2.3 |
| Last Run, pH | 6.1 | 6.0 | 6.05 | 6.05 | 6.1 | 5.9 |
| Made up Kettle, °P | 9.55 | 9.5 | 9.5 | 9.7 | 9.7 | 9.6 |
| Made up Kettle, pH | 5.85 | 5.85 | 5.85 | 5.80 | 5.88 | 5.80 |
| Kettle volume, l | 65 | 64.8 | 65.2 | 65.5 | 65.3 | 66 |
| Run off time, min | 37 | 35 | 31 | 42 | 45 | 30 |
| Wort Clarity | Excellent | | | Excellent | | |
| Yield, Percent | 71.02 | 70.43 | 70.87 | 72.76 | 72.54 | 72.49 |
| Grist Screen Analysis, percent on screen— | | | | | | |
| #10 | | 11.5 | | | 4.4 | |
| #14 | | 25.5 | | | 8.2 | |
| #18 | | 24.0 | | | 23.4 | |
| #30 | | 17.5 | | | 29.8 | |
| #60 | | 13.0 | | | 21.8 | |
| #100 | | 4.5 | | | 11.9 | |
| Pan | | 4.0 | | | 2.2 | |
| Average Yield, percent | | 70.77 | | | 72.59 | |
| Average run off time, min | | 34 | | | 39 | |

It will be evident from the above data that the grist for the specials was considerably finer than that for the controls and that a significant increase in yields were obtained with only a slight decrease in average run off time.

Example 5

A full plant scale all malt ale brew was made using dehulled fine ground malt prepared in accordance with the invention.

20,000 lbs. of a normal malt blend was dehulled in an Entoleter scourer-aspirator, the kernels and hulls being rebagged separately. The dehulling was done at a feed rate of 1600 p.p.h. with a dehuller speed of 1500 r.p.m. All materials were weighed out of the Entoleter dehuller and hull removal was found to be 13.15%. The dehulled kernels were then pneumatically conveyed to the brewery malt hopper. The exact amount of hulls, 2450 lbs., were carried to the malt weigh hopper and dumped in during milling. The malt weigh hopper was filled to the desired weight, 18,600 lbs. with the grist.

Prior to the milling the malt mill roll spacing was decreased. The original and new settings are shown below along with the normal and special grist analysis. The special grist analysis was done after combining the appropriate amount of hulls with the grist sample.

TABLE E

|  | Normal | | | | Special | |
|---|---|---|---|---|---|---|
| Roll Spacing: | | | | | | |
| Top, in | 0.055, | 0.055, | 0.054 | 0.050, | 0.050, | 0.049 |
| Center, in | 0.043, | 0.042, | 0.037 | 0.038, | 0.037, | 0.030 |
| Bottom, in | 0.045, | 0.076, | 0.080 | 0.045, | 0.076, | 0.080 |
| Grist Analysis, percent on screen— | | | | | | |
| #10 | 21.6 | | | | 8.3 | |
| #14 | 37.0 | | | | 34.5 | |
| #18 | 18.5 | | | | 27.5 | |
| #30 | 10.7 | | | | 14.3 | |
| #60 | 8.0 | | | | 10.0 | |
| #100 | 2.2 | | | | 2.9 | |
| Pan | 2.0 | | | | 2.5 | |

It will be evident from the above data that the special grist was ground finer than normal but did not have significantly more flour.

Following milling, the brew was run in the usual manner and a yield of 73.5% was obtained. Wort clarity and run-off time were normal while the yield of 73.5% was a significant improvement over the average yield on 18 similar brews from the same type of malt prepared in the usual manner.

We claim:

1. In a process for producing brewers' wort in which cereal grains are ground to form a grist, a mash of the grist is formed, the starches in the mash are converted to sugars and the liquid in the converted mash is filtered out as brewers' wort, the improvement which comprises dehulling the grain, fine grinding the dehulled grain and recombining at least part of the hulls removed before grinding with the ground dehulled grain in the mash.

2. A process according to claim 1, wherein the grain is malt.

3. A process according to claim 1, wherein the grain is unmalted barley.

References Cited

UNITED STATES PATENTS 2,726,957    12/1955    Kunz ---------------- 99—52

FOREIGN PATENTS 21,941    7/1908    Great Britain.

A. LOUIS MONACELL, *Primary Examiner.*

N. ROSKIN, *Assistant Examiner.*